Aug. 28, 1951     J. G. WRIGHT ET AL     2,566,104
FASTENER FORMING AND INSERTING MACHINE
Filed Sept. 8, 1947                       6 Sheets-Sheet 1

Inventors
John G. Wright
James M. Chafin
Eugene Sudan
Charles A. Stotkins
By John A. Hanson Parratt and Richards Attorneys

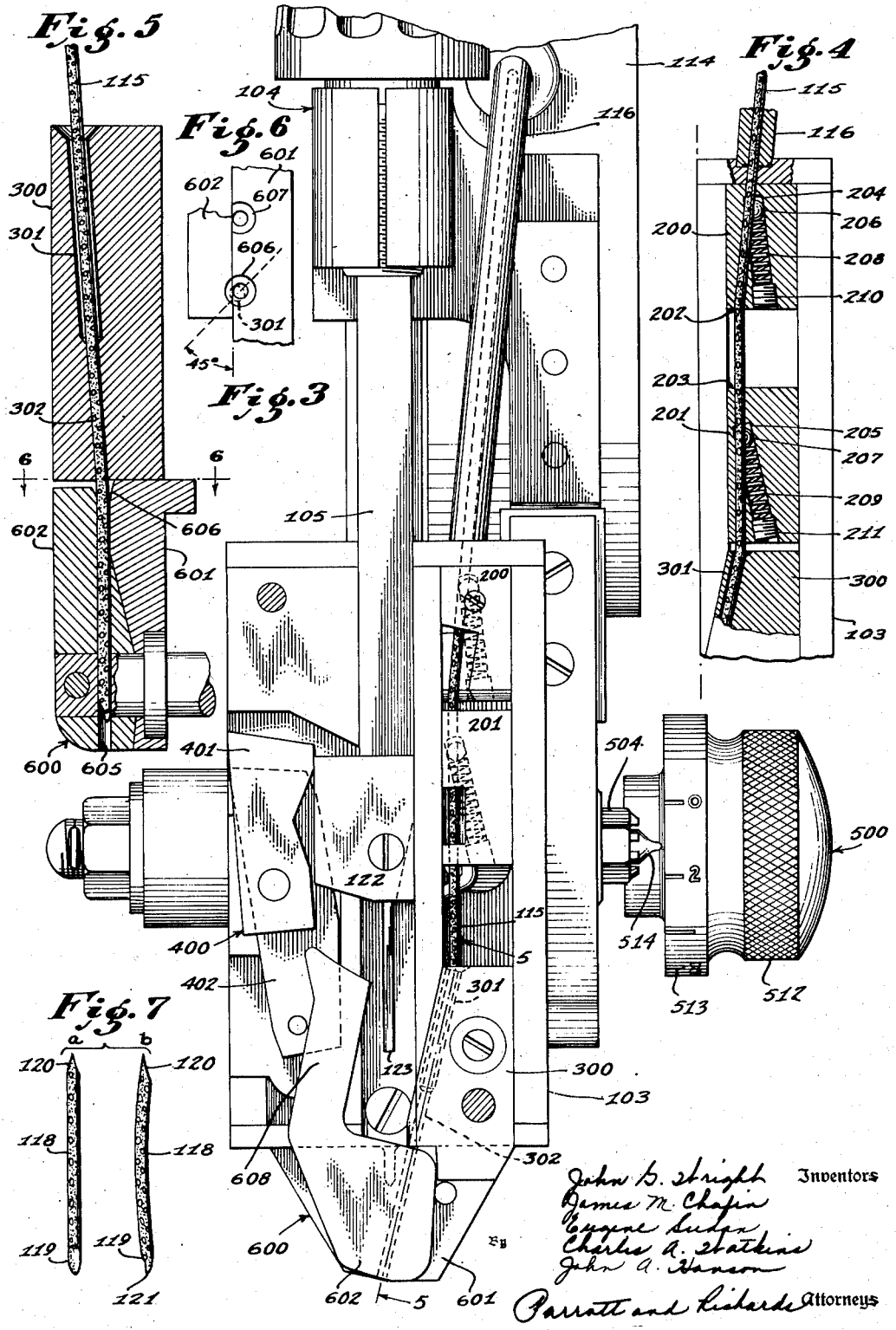

Aug. 28, 1951  J. G. WRIGHT ET AL  2,566,104
FASTENER FORMING AND INSERTING MACHINE
Filed Sept. 8, 1947  6 Sheets-Sheet 3
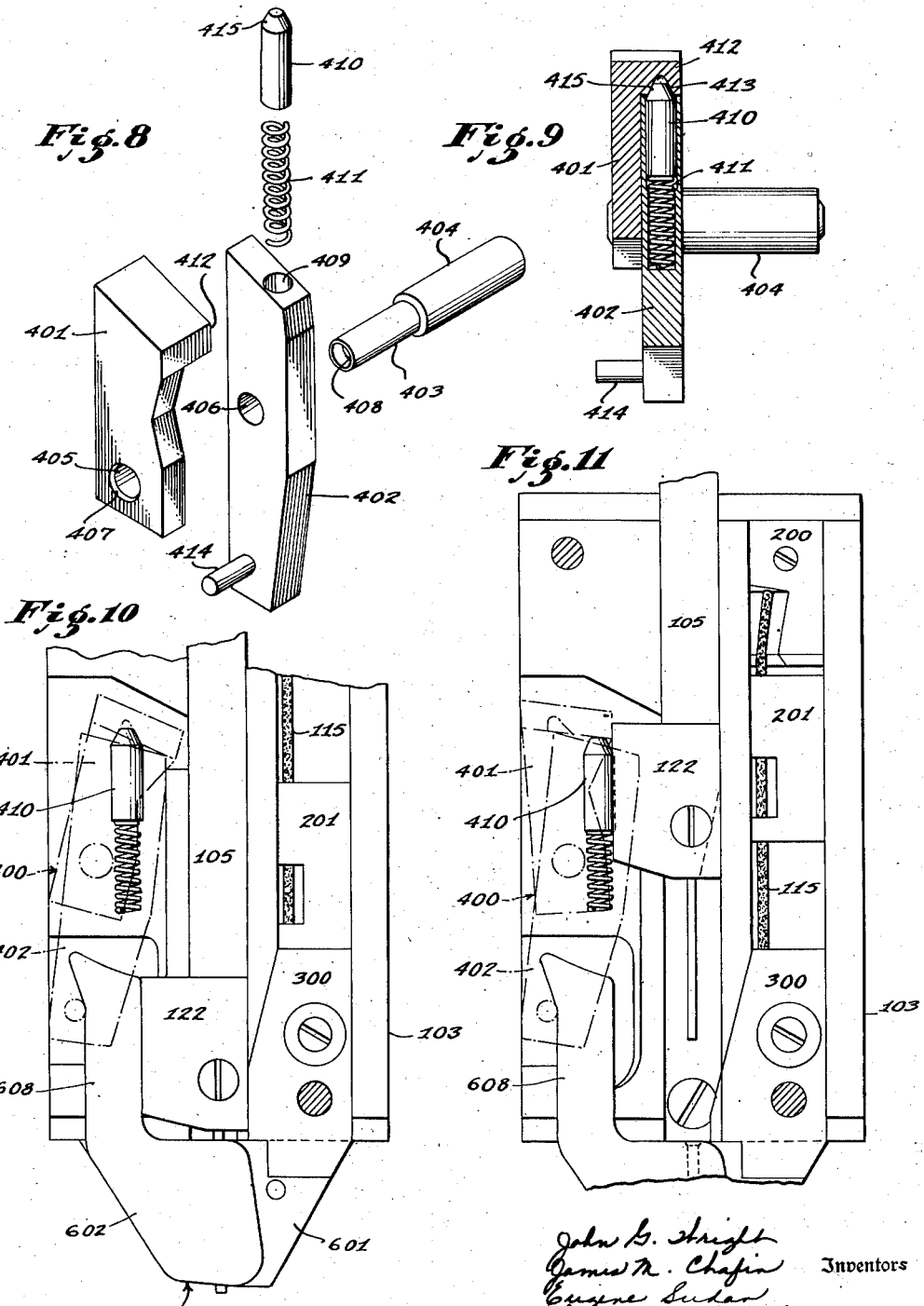

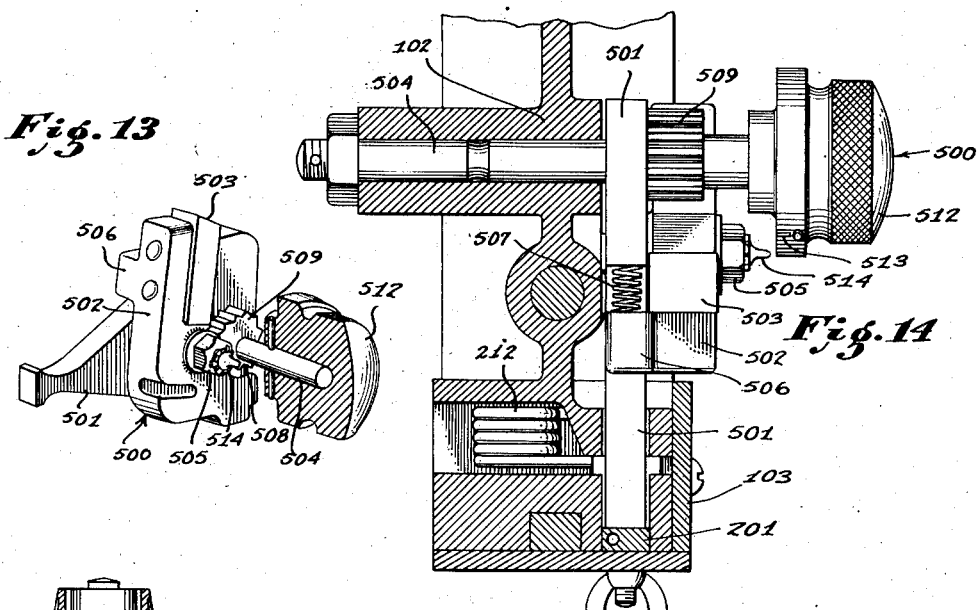

Aug. 28, 1951         J. G. WRIGHT ET AL         2,566,104
FASTENER FORMING AND INSERTING MACHINE
Filed Sept. 8, 1947                                      6 Sheets-Sheet 5
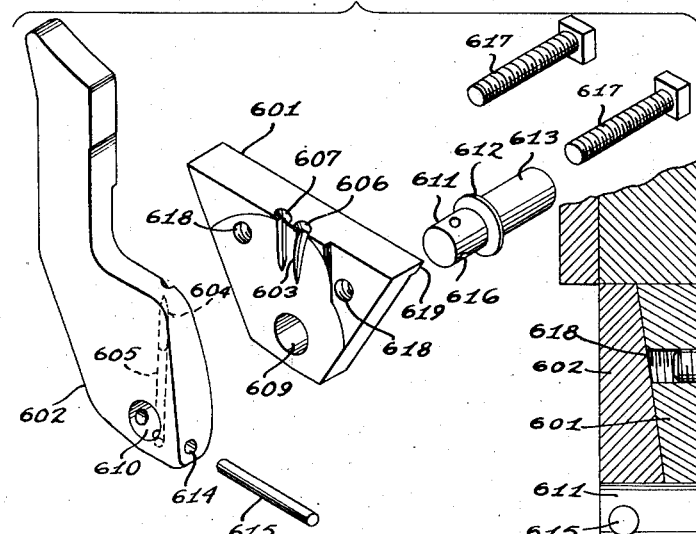
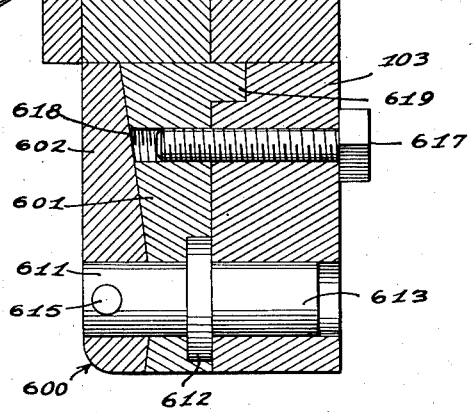
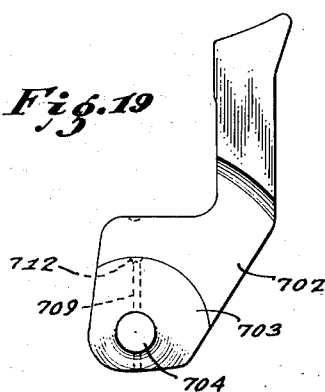
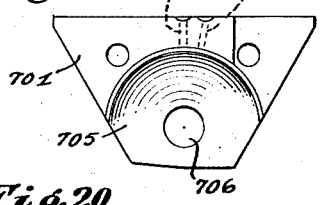
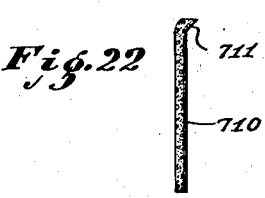
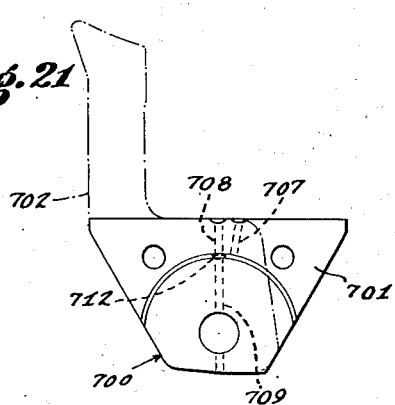

Aug. 28, 1951 J. G. WRIGHT ET AL 2,566,104
FASTENER FORMING AND INSERTING MACHINE
Filed Sept. 8, 1947 6 Sheets-Sheet 6
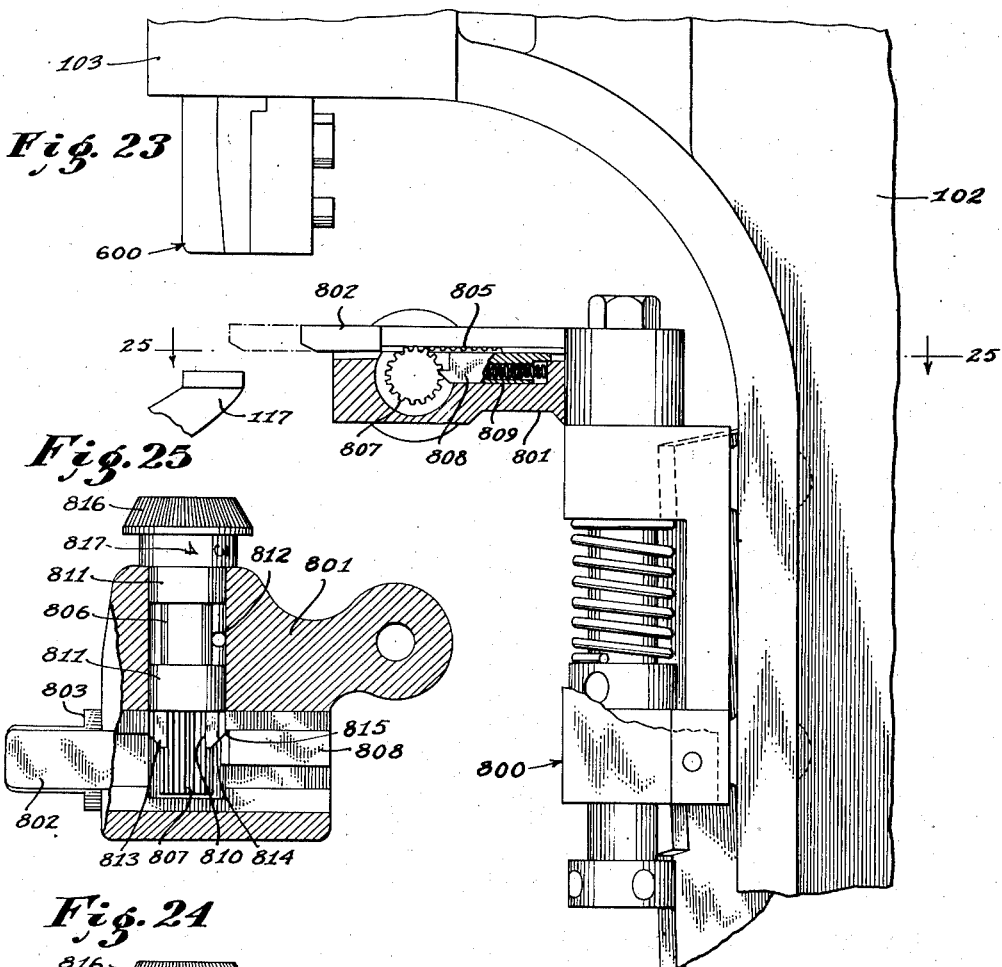
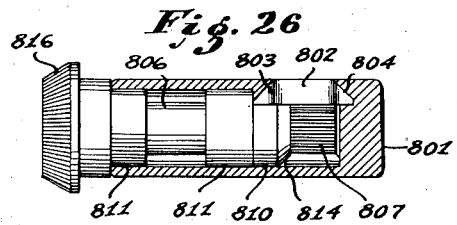
Inventors
John G. Wright
James M. Chapin
Eugene Ludger
Charles A. Starkins
John A. Hanson
By Parratt and Richards Attorneys Patented Aug. 28, 1951

2,566,104

UNITED STATES PATENT OFFICE 2,566,104

FASTENER FORMING AND INSERTING MACHINE

John G. Wright, James M. Chafin, Eugene Sudan, and Charles A. Watkins, Atlanta, and John A. Hanson, College Park, Ga., assignors to The Auto-Soler Company, a corporation of Georgia Application September 8, 1947, Serial No. 772,824

11 Claims. (Cl. 164—40)

This invention relates to fastener forming and inserting machines of the type in which fasteners are formed from a continuous length of wire or the like and inserted in material to be secured.

The machine of the present invention is particularly adapted for soling shoes, and has features in common with the machine disclosed in the copending application of Wright et al., Ser. No. 595,776, filed May 25, 1945, issued August 29, 1950, as Patent No. 2,520,521. As in the case of the above copending application, the present machine may also be modified for use in woodworking operations, and differs over the machine disclosed in the prior application in the incorporation of improved operating elements which provide substantial structural and operating advantages as described more in detail below.

The present invention is illustrated, with particular reference to the above mentioned improved features, in the accompanying drawing, in which:

Fig. 3 is an enlarged detail of the operating head and related elements;

Fig. 4 is a corresponding fragmentary detail, mainly in section, of the wire feed block members;

Fig. 5 is a sectional detail taken substantially on the line 5—5 of Fig. 3, and illustrating the arrangement of the wire guide block;

Fig. 6 is an exaggerated plan detail oriented at the line 6—6 in Fig. 5 to illustrate the disposition of the wire guide block in relation to the fastener forming knife assembly;

Figs. 7a and 7b are front and right side elevations, respectively, of the type of fasteners formed according to the present invention;

Fig. 8 is a blown-apart assembly view of the trip lever included with the means for actuating the knife assembly;

Fig. 9 is a sectional detail of the assembled trip lever taken on the axis of the holding pin;

Fig. 10 is a fragmentary front elevation of the operating head showing the trip lever, partly represented by broken lines, in operating position;

Fig. 11 is a corresponding detail showing the disposition of the trip lever upon dislodgement of the holding pin;

Fig. 12 is a fragmentary side elevation, partly in section, of the operating head and supporting structure of the machine showing the wire feed mechanism;

Fig. 13 is a perspective view, partly in section, of the wire feed lever arm assembly;

Fig. 14 is a sectional detail in plan taken substantially on the mounting axis of the lever arm assembly;

Fig. 15 is a fragmentary side elevation, partly in section, showing the lever arm assembly in a displaced position;

Fig. 16 is a blown-apart assembly view illustrating the manner of assembling the fastener forming knife assembly according to the present invention;

Fig. 17 is a sectional detail showing the manner of mounting the knife assembly on the operating head;

Fig. 18 is a view showing the working face of the stationary blade member of a modified form of knife assembly;

Fig. 19 is a corresponding view of the working face of the matching movable blade member;

Fig. 20 is a top plan view of the movable blade member shown in Fig. 19 oriented in relation to the stationary blade member shown in Fig. 18;

Fig. 21 is a front elevation of the assembled knife assembly in fastener inserting position, with the movable blade member indicated by broken lines;

Fig. 22 is a detail of the type of fastener formed by the modified knife assembly shown in Figs. 18 to 21;

Fig. 23 is a fragmentary side elevation of the guide means provided for positioning material to be secured in relation to the machine of the present invention;

Fig. 24 is a plan detail, mainly in section, illustrating the arrangement of the extending guide arm of the guide means shown in Fig. 23;

Fig. 25 is a corresponding detail showing the adjusting elements of the guide means positioned for varying the disposition of the extending guide arm; and Fig. 26 is a transverse sectional detail showing further the arrangement of the adjusting elements for the extending guide arm.

Figures 1, 2:
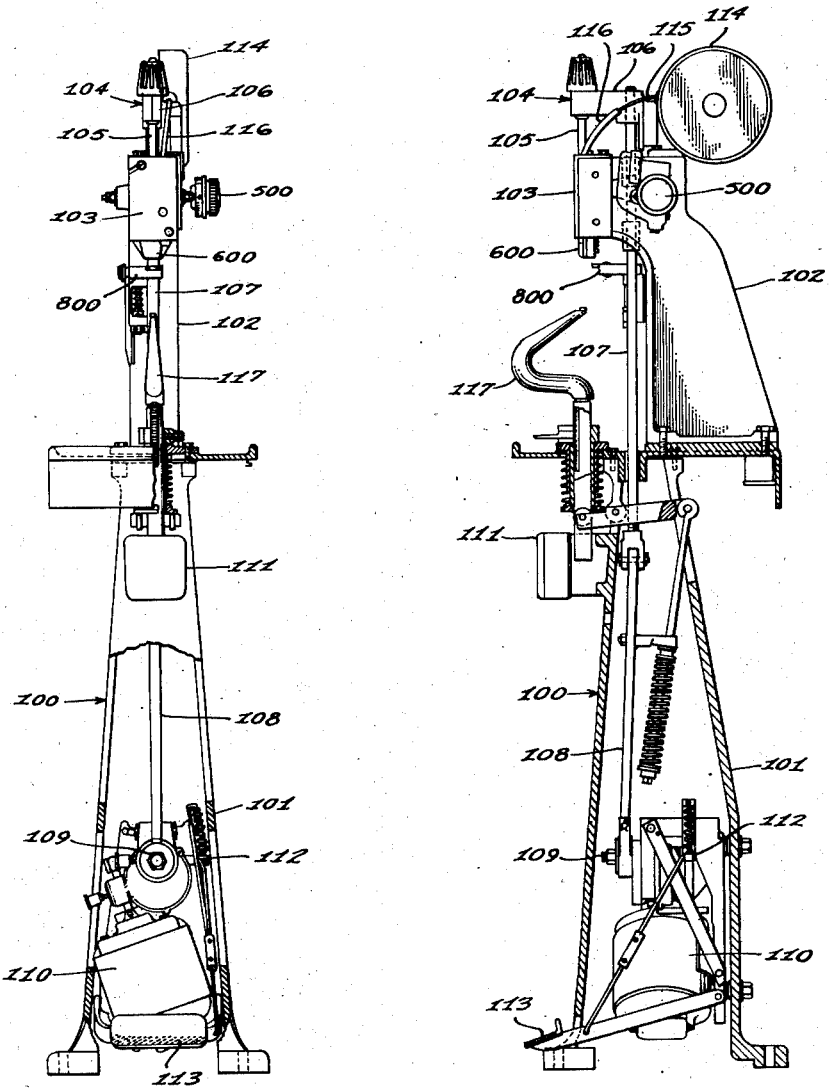
Fig. 1 is a front elevation, partly cut away, of a fastener forming and inserting machine constructed in accordance with the present invention.
Fig. 2 is a corresponding side elevation.

Referring first to Figs. 1 and 2 of the drawing, the fastener forming and inserting machine shown comprises a suitable frame structure 100 made up of a vertically extending base portion 101 adapted to support the machine on a floor or similar surface, and an upper frame section 102 carried at the upper extending end of the base portion 101. The upper frame section 102 is arranged to support an operating head 103 and an associated plunger mechanism 104 adapted for cyclic actuation of a knife assembly, indicated generally at 600, for fastener forming and fastener inserting operations as described more in detail below.

The plunger mechanism 104 comprises a plunger 105 carried in a crossarm 106 which is mounted to extend from an operating rod 107 supported for reciprocating movement by the upper frame section 102. The operating rod 107 extends downwardly to the base portion 101 for association with a connecting arm 108 which is actuated from a crank mechanism at 109 driven by a motor unit 110. The motor unit 110 may be equipped for operation with conventional electrical connections (not shown) arranged through a conveniently disposed switch box as at 111. A clutch mechanism 112 is interposed between the motor unit 110 and the crank mechanism 109, and is arranged for actuation from a foot pedal 113. This arrangement is such that depression of the foot pedal 113 results in actuation of the clutch mechanism 112 to connect the motor unit 110 for driving the crank mechanism 109 with consequent reciprocation of the operating rod 107 through connecting arm 108. A motor unit and related operating elements of the type just described above are also incorporated in the fastener forming and inserting machine disclosed in the above identified copending application, and reference is made to that application for further details.

The upper frame section 102 also supports a wire mounting reel 114 from which wire 115 (see Figs. 3 and 4) for forming fasteners is trained through a tubular guide 116 to the operating head 103, and a lever arm assembly 500 arranged for actuation by the plunger mechanism 104 for feeding the wire 115 from reel 114 to the operating head 103. In addition, the upper frame structure 102 supports a guide means 800 for positioning material to be secured in relation to said machine, as described further below; and a work support 117 such as is disclosed in my above identified copending application.

The operating head 103, as shown more in detail in Fig. 3 of the drawing, is formed to accommodate vertical reciprocation of the plunger 105 at a generally central position, and to receive the wire 115 so that it is directed downwardly along one side to the fastener forming knife assembly 600. The wire 115 is received at the top of the operating head 103 from the tubular guide 116, and is directed from this point through wire feed blocks 200 and 201. Feed block 200 is mounted in fixed relation on operating head 103, while feed block 201 is arranged for sliding movement in the operating head 103, this movable feed block 201 being actuated for feeding wire to the knife assembly 600 by the lever arm assembly 500 as will be described presently.

Each of the feed blocks 200 and 201 are formed with passageways for the wire 115, as indicated at 202 and 203, and have recesses 204 and 205 oriented on an axis inclined toward the axis of the passageways 202 and 203 in a direction opposite to the direction in which the wire 115 is fed, which recesses partially open into the passageways 202 and 203. Ball members 206 and 207 are yieldingly positioned in the recesses 204 and 205 by springs 208 and 209, which are held in place by set screws 210 and 211. By virtue of the partial opening of the recesses 204 and 205 into the wire passageways 202 and 203, the ball members 206 and 207 are positioned by the springs 208 and 209 to extend into the passageways 202 and 203 in contact with the wire 115. And, in view of the inclination of the recesses 204 and 205, movement of feed block 201 in the direction in which the wire 115 is fed, or movement of the wire 115 in a reverse direction through the fixed feed block 111, will cause the ball members 205 or 204 to roll in their respective recesses and grip the wire so that relative movement between the wire and the feed block is prevented while relative movement of the wire and feed blocks oppositely may take place freely. Accordingly, the wire 115 is gripped by ball member 207 for feeding movement with the movable feed block 201 and by ball member 206 for preventing withdrawal through the stationary feed block 200, but is free for feeding movement through the stationary feed block 200 and is not disturbed by return movement of the movable feed block 201.

A guide block 300 is arranged to direct the wire 115 from the feed blocks 200 and 201 to the fastener forming knife assembly 600. The guide block 300 is mounted on the operating head 103 in fixed relation to the knife assembly 600, and is characterized by a directing passageway 301 disposed to guide the wire 115 to the knife assembly 600 which is slightly misaligned at the point of entrance to the knife assembly to impress a portion of the wire 115 of approximate fastener length with a cast during fastener forming operations so that the fasteners formed from the wire are conditioned for straight driving as explained further below.

The fastener forming knife assembly 600, which may be of the same general type disclosed in the above identified copending application, comprises a stationary blade member 601 and a matched movable blade member 602 having complementary fastener forming shearing edges 603 and 604 (compare Fig. 16) adapted to cut wire diagonally to form a fastener point. The movable blade member 602 is formed adjacent the shearing edge 604 to provide a passageway 605, and the stationary blade member is recessed as at 606 adjacent the shearing edge 603 to complete the passageway 605 so that the assembled blade members are adapted to receive and position the wire 115 in relation to the shearing edges 603 and 604 for fastener forming operations. The stationary blade member is also recessed at 607 to complete the passageway 605 in fastener forming position, reference being made to the above copending application for further details of the arrangement of the knife assembly 600 in this manner.

The wire 115 directed from the passageway 301 in the guide block 300 is received by the knife assembly 600 adjacent the shearing edges 603 and 604 in the passageway 605 as completed by the recess 606 in fastener forming position (compare Fig. 5). The misalignment of the directing passageway 301 in guide block 300, which is exaggerated for purposes of illustration in Fig. 6, results from disposition of the passageway 301 at the point of entrance to the knife assembly 600 with a displacement both toward the movable blade member 602 and in a direction opposite to the direction of fastener forming movement of the movable blade member. It appears that in the usual case best results are obtained by equal displacement in both directions so that the directing passageway 301 of guide block 300 is misaligned with the passageway 605 and recess 606 in knife assembly 600 on a bias of 45°, as indicated in Fig. 6. As mentioned above, this misalignment is slight, the displacement in either direction being only of the order of .010 inch, so that the wire 115 is still easily fed from the guide block 300 to the knife assembly 600. However, as the directing passageway 301 is formed adjacent the knife assembly 600 to fit the wire 115 snugly as indicated at 302, the misalignment of the directing passageway 301 will position the wire 115 in the knife assembly 600 so that fastener forming action of the knife assembly will exert a bending force on a portion of the wire 115 of approximate fastener length extending from the guide block 300 to the shearing edges 603 and 604, so that this portion of wire is impressed with a cast which appears in the fasteners formed from the wire to condition them for straight driving.

The nature of the fastener formed in this manner is illustrated in Figs. 7a and 7b of the drawing. The fastener shown and identified by the reference numeral 118 is formed with a diagonally cut driving point 119 and a correspondingly reversely cut trailing point 120. Difficulty with straight driving is inherently encountered with a fastener having a diagonally cut driving point of this sort because it is offset from the longitudinal axis of the fastener body and has a tendency to deflect in the direction of offset during driving. As described in the above co-pending application, this difficulty may be counteracted by forming the knife assembly to displace the fastener point 119 to a position substantially coincident with the longitudinal axis of the fastener, as indicated at 121 in Fig. 7b. Further improved results in this respect are obtained according to the present invention by placing the above noted cast in the fastener body 118, as shown best in Fig. 7b, so that the driving point 119 and the trailing point 120 are aligned in the path of the driving force applied to the fastener and the imbalance resulting from the diagonally cut ends is thus counteracted.

As previously mentioned, the knife assembly 600 is actuated for fastener forming and fastener inserting operations by the plunger mechanism 104. For this purpose, the plunger 105 is fitted with a cam block 122 (see Fig. 3) at its lower end disposed to displace a cam arm 608 on the movable blade member 602 on each downward stroke of the plunger 105. With the knife assembly 600 in fastener forming position as shown in Fig. 3, displacement of the cam arm 608 by the cam block 122 upon downward movement of the plunger 105 results in shifting the movable blade member 602 to fastener inserting position (compare Fig. 10). Shifting of the movable blade member 602 in this manner effects cutting of the wire 115 positioned in the knife assembly 600 to form a fastener, and transfer of the fastener formed for insertion by a driver 123 disposed on plunger 105 to penetrate the knife assembly 600 in fastener inserting position and drive the fasteners formed.

Return movement of the movable blade member 602 to fastener forming position is effected during each upward stroke of the plunger 105 through a trip lever (indicated generally in Fig. 3 at 400), which is pivotably mounted on the operating head 103 to follow cam block 122 for actuation of the return movement. The trip lever 400, the details of which appear best in Figs. 8 and 9, comprises a first body member 401 and a second body member 402 assembled on a pivot pin 403. The pivot pin 403 is formed with a portion 404 of enlarged diameter which serves as a means for pivotably mounting the trip lever 400 on the operating head 103, and forms a shoulder against which the body members 401 and 402 may be assembled. Each of the body members 401 and 402 are formed with apertures 405 and 406 disposed for alignment on the pivot pin 403, the aperture 405 in the first body member 401 being chamfered as indicated at 407 to allow clenching of the extending end of the pivot pin 403, which may be specially formed for this purpose as shown at 408, to fix the body members 401 and 402 in assembled relation on the pin 403.

The second body member 402 is further formed with a generally longitudinal recess 409 adapted to receive a holding pin 410 and a spring 411 for yieldingly positioning the holding pin 410 normally to extend from the recess 409. The first body member 401 is shaped with an overhanging portion 412 which extends in covering relation with respect to the recess 409 and in which a recess 413 is located to receive the holding pin 410 for keying the body members 401 and 402 so that they will pivot as a unit. With the body members 401 and 402 keyed in this manner, the first body member 401 will follow the cam block 122 upon upward movement of plunger 105 so that the second body member 402, which is fitted with a pin 414 to contact the cam arm 608, will pivot to return the movable blade member 602 to fastener inserting position. Under normal conditions the pressure of spring 411 is adapted to hold the pin 410 in recess 413 so that the body members 401 and 402 of trip lever 400 operate as a unit for this purpose.

In the event, however, that the knife assembly 600 jams in fastener inserting position because of a faulty fastener or for other reasons, the yieldingly positioned arrangement of holding pin 410 allows the trip lever 400 to give during the upward stroke of plunger 105 so that damage to the knife assembly 600 by forcing it from a jammed position is avoided. Under such conditions the additional force required to move the knife assembly 600 from the jammed position causes holding pin 410 to slip out of the recess 413 and allow the body members 401 and 402 to pivot with respect to each other on the pivot pin 403. As a result, the plunger 105 is allowed to complete its upward stroke with the knife assembly 600 remaining in fastener inserting position (compare Figs. 10 and 11). After the condition causing jamming of the knife assembly 600 is repaired so that normal operation may be resumed, the trip lever 400 may readily be reset to seat holding pin 410 in recess 413 for normal functioning. To facilitate seating and release of the holding pin 410 with respect to recess 413, the extending end of the holding pin 410 is tapered as shown at 415 and the recess 413 is formed with a complementary configuration.

Feeding of the wire 115 to the knife assembly 600 for fastener forming operations is also actuated by the plunger mechanism 104. Feeding movement of the wire 115 is effected directly by the lever arm assembly 500, mentioned above, which is mounted on the upper frame section 102 in relation to a cam block 124 carried on the crossarm 106 of plunger mechanism 104 (see Figs. 12 to 15, inclusive). The lever arm assembly 500 comprises a lever arm 501 pivotably extending to the movable feed block 201 for movement to feed the wire 115, and a body member 502 pivoted on the extending portion of lever arm 501 and carrying a second cam block 503 for displacement by the cam block 124 on crossarm 106 to effect the feeding movement.

The manner in which the lever arm 501 and body member 502 are assembled and mounted on the upper frame section 102 is illustrated in Figs. 13 and 14. The pivotable mounting of lever arm 501 is provided by a shaft member 504 which is supported transversely in the upper frame section 102 as shown in Fig. 14, and the body member 502 is assembled with the lever arm 501 on a pivot pin at 505. The body member 502 is formed with an offset portion 506 disposed to contain a spring 507 in position to bear against the lever arm 501 (see Fig. 14), and place a turning movement on the body member 502 about the pivot pin 505 in a counterclockwise direction as seen in Figs. 12 and 15. This turning movement is resisted by the contact of a positioning pin 508, carried by the body member 502, with a selector cam 509 mounted on shaft member 504. The selector cam 509 is formed with a series of stepped notches defined by angular faces having a low angle of inclination as disclosed in the above copending application, and the extending end of the positioning pin 508 is formed with two flat faces so that it presents a pointed edge for seating in the stepped notches of the selector cam 509. The positioning pin 508 is held in place in the body member 502 by a set screw 510 and is adjusted to a proper extending disposition by a second set screw 511.

With the body member 502 in a given pivoted position of lever arm 501, as determined by the point of contact of positioning pin 508 with selector cam 509, the feeding movement of lever arm 501 is effected by displacement of the cam block 503 on body member 502 by the cam block 124 upon downward movement of the crossarm 106 of plunger mechanism 104. As shown in Fig. 12, downward movement of crossarm 106 causes the lower end of cam block 124 to contact the top face of cam block 503, which forces the body member 502 downward with consequent feeding movement of the lever arm 501 pivotably on shaft member 504. This pivoting movement of the lever arm 501 results in translation of the cam block 503 to the left as seen in Fig. 12, so that its top face is shifted from beneath cam block 124; and when this happens feeding movement of the lever arm 501 is stopped, as the cam block 124 will merely slide down the side face of cam block 503 during the remainder of the downward stroke of plunger mechanism 104 (compare Fig. 15). During the upward return stroke of plunger mechanism 104, the lever arm assembly 500 is returned to initial position as soon as cam block 124 clears cam block 503 by a coil spring 212 arranged in the operating head 103 to urge the movable feed block 201 upwardly.

From the foregoing it will be seen that the relative disposition of the top face of cam block 503 with respect to the lower end of cam block 124 determines the extent of the feeding movement or stroke of the lever arm 501; and that by varying this relative disposition, the length of stroke, and consequently the length of wire 115 fed to knife assembly 600, may be adjusted in accordance with the length of fastener desired. The selector cam 509 is provided to perform this function, the various stepped notches of the selector cam 509 determining by contact with positioning pin 508 a corresponding variety of pivoted positions for the body member 502 and cam block 503. A manipulating knob 512 may be conveniently arranged on the end of shaft member 504 extending beyond the selector cam 509 for adjustment of the point of contact with positioning pin 508, and suitable scale markings, as indicated at 513 in Figs. 3 and 14, may be delineated on the manipulating knob 512 in relation to a pointed tip 514 on pivot pin 505 to provide an indication for selection of the fastener length desired.

The fastener forming knife assembly 600, which requires the most delicate operating adjustment, and is perhaps the most vital and the most easily damaged, of all the operating elements of the machine, is provided according to the present invention as an inseparable assembly arranged for mounting on and removal from the operating head 103 as a unit, so that the operating adjustment may be fixed at the time of assembly rather than at the time of mounting on the operating head, and the assembly may be easily removed and replaced in the operating head when repairs are needed, while at the same time preventing disassembly or tampering with the knife assembly by unskilled attendants.

For assembly in this manner, the stationary blade member 601 and movable blade member 602 of knife assembly 600 are formed with apertures 609 and 610 defining a pivot axis for the movable blade member 602 with respect to stationary blade member 601, and a pivot pin 611 is provided to extend through the apertures 609 and 610 to carry blade members 601 and 602 in assembled relation. The pivot pin 611 is formed with a flange portion 612 about midway of its length which fixes its extending position through the aperture 609 in stationary blade member 601, the other extending end of pin 611 serving as a dowel means for locating the knife assembly on operating head 103, as shown at 613 in Fig. 17. The aperture 610 in movable blade 602 is intersected by a transverse opening 614 adapted to receive a dowel pin 615, and the pivot pin 611 is formed with a corresponding transverse opening 616, so that the dowel pin 615 can be inserted to lock the movable blade member 602 on pivot pin 611 in assembled position. When assembled in this manner the stationary and movable blade members 601 and 602 comprise an inseparable unit which is mounted on the operating head 103 in proper position by virtue of the locating function of the extending end of pivot pins 611 and 613, and fastened in place by screws 617 extended through the operating head 103 for engagement in tapped holes 618 in the stationary blade member 601. The stationary blade member 601 is further formed with a flange portion 619 at its upper rear edge which is arranged for seating in a notch formed in operating head 103, as shown in Fig. 17, to provide a further support for the stationary blade member 601 on the operating head.

In the modified form of knife assembly 700 illustrated in Figs. 18 to 21, inclusive, of the drawing, the same type of inseparable assembly arrangement may be used, the modified feature in this case being the adaption of the knife assembly for forming a headed blunt type fastener as shown in Fig. 22. Figs. 18 and 19 show the working faces of the stationary blade member 701 and movable blade member 702, respectively, as used in this blunt type knife assembly 700, and Fig. 20 is a top plan view of the movable blade member 702 positioned in relation to the stationary blade member 701. For forming the blunt type of fastener, the movable blade member 702 is formed with a cylindrical projection 703 concentric with its pivot axis as defined by the aperture 704, and the stationary blade member 701 is formed with a complementary cylindrical recess 705 which is likewise concentric with the aperture 706 defining the pivot axis in the blade member. The stationary blade member 701 is further formed with passageways 707 and 708 opening into the cylindrical recess 705 in fastener forming and fastener inserting positions on an axis normal to the axis of the recess 705. The movable blade member 702 is also formed with a passageway 709 positioned to extend entirely through the cylindrical projection 703 for alignment with the passageways 707 and 708 of the stationary blade member 701 in fastener forming and fastener inserting positions.

Accordingly, with the knife assembly 700 in fastener forming position, wire may be fed through the passageway 707 in stationary blade member 701 to a depth in the passageway 709 of movable blade member 702 corresponding to the length of fastener desired, so that shifting of the movable blade member for fastener forming operations as described above will result in cutting of the wire through shearing action at the adjoining faces of the cylindrical projection 703 and recess 705 to form a blunt pointed fastener 710 as shown in Fig. 22. To provide a headed configuration 711 on the fastener 710, the opening of the passageway 709 at the surface of the cylindrical projection 703 is flared as at 711 which results in bending of the trailing end of the fasteners 710 incident to the shearing action that forms the fasteners. This bending forms an offset in a direction opposite to the direction of fastener forming movement of the movable blade member 702 to form the headed configuration 711 illustrated in Fig. 22. Blunt type fasteners 710 of this type are particularly well adapted for use in woodworking operations where the material to be secured is easily penetrated and a fastener of increased holding power is desired.

The fastener forming and inserting machine of the present invention is also provided with an improved type of guide means 800, as previously mentioned, for positioning material to be secured in relation to the machine as shown in Figs. 23 to 26, inclusive of the drawing. The guide means 800 is of the same general type as disclosed in the above copending application, and in United States Patent 2,315,382, issued March 30, 1943, to Ajouelo et al., but incorporates an improved arrangement for adjustment of the guide means.

As described in the above noted prior application and patent, the guide means 800 comprises a bracket member 801 pivotally mounted on the upper frame structure 102 and adapted to assume several positions for guiding material on the work support 117 in relation to the operating head 103, or swing to a retracted position when not in use. The bracket member 801 which is adapted for functioning in this manner in accordance with the previous disclosures, is further arranged to carry an extending guide arm 802 for sliding movement in association with means for adjusting the extending disposition of the guide arm 802 and locking it in place when adjusted. The guide arm 802 is formed with beveled edges 803 to fit correspondingly undercut grooves 804 in the bracket member 801 which accommodate the guide arm 802 for sliding movement on the bracket member 801. The guide arm 802 is further formed with a toothed portion in the nature of a rack as shown most clearly at 805 in Fig. 23. A shaft member 806 is also carried by the bracket member 801 for sliding movement transversely with respect to the guide arm 802, and shaft member 806 also has a toothed portion 807 forming a pinion disposed for engagement with the rack portion 805 on guide arm 802. A pawl member 808 is yieldingly positioned by a spring 809 in bracket member 801 for normally engaging the pinion 807 (see Fig. 23) to lock it against rotation, and consequently lock the guide arm 802 in a corresponding extended position.

To release the pinion 807 for adjustment of the guide arm 802, the shaft member 806 is fitted with a cam 810 adapted to displace the pawl member 808. As mentioned above, the shaft member 806 is carried for sliding movement in the bracket 801, bearing portions 811 being journalled in the bracket 801 so that the shaft member 806 may rotate or slide transversely as desired. A pin 812 is fitted in the bracket 801 between the bearing portions 811 to prevent removal of the shaft member 806 and provide a stop in inactive position as shown in Fig. 24. The cam 810 is carried on the shaft member 806 adjacent the pinion 807, and takes the general form of a collar cut away to form a flat face at 813 which seats under the guide arm 802 so that rotation of the cam 810 with shaft member 806 is prevented. The cam 810 has a beveled cam surface at 814 adapted to contact a similar bevel 815 on pawl member 808 and displace it when the shaft member 806 is translated to adjusting position as shown in Fig. 25. Accordingly, by shifting the shaft member 806, the extending guide arm 802 may be easily adjusted or locked in position as desired to facilitate fastener forming operations being carried out on the machine. The shaft member 806 is fitted with an adjusting knob 816 at its extending end, which is preferably marked as indicated at 817 to provide for gauging the adjusted position of guide arm 802.

The improved wire feeding mechanism and guide means of the present invention as described above are disclosed and claimed in our divisional applications Serial No. 208,221 and Serial No. 208,222.

We claim:

1. In a fastener forming and inserting machine adapted for forming fasteners from a continuous length of wire: the combination with a fastener forming knife assembly comprising a stationary blade member and a matched movable blade member having complementary fastener forming shearing edges adapted to cut said wire diagonally to form a fastener point, and formed with a passageway adapting said blade members to receive and position wire in relation to said shearing edges; of a guide block for directing wire to said knife assembly, said guide block being adapted for mounting in fixed relation with respect to said knife assembly and being characterized by a directing passageway disposed to guide said wire to the passageway of said knife assembly and slightly misaligned at the point of entrance to said knife assembly passageway both toward said movable blade member and in a direction opposite to the direction of fastener forming movement of said movable blade member, whereby a portion of said wire of approximate fastener length extending from said guide block to the shearing edges of said knife assembly is impressed with a cast during fastener forming operations to condition fasteners formed from said wire for straight driving.

2. In a fastener forming and inserting machine adapted for forming fasteners from a continuous length of wire: the combination with a fastener forming knife assembly comprising a stationary blade member and a matched movable blade member having complementary shearing edges adapted to cut said wire diagonally to form a fastener point, and being formed adjacent said shearing edges to provide a passageway for receiving and positioning wire in relation to said shearing edges; of a guide block for directing wire to said knife assembly, said guide block being adapted for mounting in fixed relation with respect to said knife assembly and being characterized by a directing passageway disposed to guide said wire to said knife assembly and fitting said wire snugly adjacent said knife assembly, and said directing passageway being slightly misaligned with respect to the positioning passageway in said knife assembly both toward said movable blade member and in a direction opposite to the direction of fastener forming movement of said movable blade member, whereby a portion of said wire of approximate fastener length extending from said guide block to the shearing edges of said knife assembly is impressed with a cast during fastener forming operations to condition fasteners formed from said wire for straight driving.

3. In a fastener forming and inserting machine adapted for forming fasteners from a continuous length of wire and having an operating head and associated means for cyclic actuation of fastener forming and fastener inserting operations: the combination with a fastener forming knife assembly comprising a stationary blade member and a matched movable blade member, said stationary blade member being adapted for mounting on said operating head and said movable blade member being adapted for assembly with said stationary blade member for movement between fastener forming and fastener inserting positions, and said blade member having complementary shearing edges adapted to cut said wire diagonally to form a fastener point and being formed adjacent said shearing edges to provide a passageway for receiving and positioning wire in relation to said shearing edges; of a guide block adapted for mounting on said operating head in fixed relation to said knife assembly, said guide block being characterized by a directing passageway disposed to guide said wire to said knife assembly and fitting said wire snugly adjacent said knife assembly, and said directing passageway being slightly misaligned with respect to the positioning passageway in said knife assembly both toward said movable blade member and in a direction opposite to the direction of fastener forming movement of said movable blade member, whereby a portion of said wire of approximate fastener length extending from said guide block to the shearing edges of said knife assembly is impressed with a cast during fastener forming operations to condition fasteners formed from said wire for straight driving.

4. In a fastener forming and inserting machine adapted for forming fasteners from a continuous length of wire of the type having a fastener forming knife assembly and associated means for cyclic actuation of said knife assembly between fastener forming and fastener inserting positions, a trip lever adapted for pivoted mounting to actuate return movement of said knife assembly from fastener inserting to fastener forming position comprising a first body member and a second body member, a pivot pin carrying said body members in assembled relation for mounting to pivot as a unit or with respect to each other, and a yieldingly positioned holding pin associated with one of said body members and normally extending for seating in a recess formed in the other of said body members, whereby said body members are normally keyed for pivoting as a unit but may be released for pivoting with respect to each other upon application of force sufficient to dislodge said yieldingly positioned holding pin from said recess.

5. The trip lever defined in claim 4 and further characterized in that the extending end of said holding pin is tapered and the recess in said other body member is formed with a complementary configuration.

6. In a fastener forming and inserting machine adapted for forming fasteners from a continuous length of wire and having a fastener forming knife assembly and associated means for cyclic actuation of said knife assembly between fastener forming and fastener inserting positions, a trip lever adapted for pivoted mounting as a cam follower for actuating return movement of said knife assembly from fastener inserting to fastener forming position, said trip lever comprising a first body member and a second body member, a pivot pin carrying said body members in assembled relation for pivoting as a cam follower unit or with respect to each other, and a yieldingly positioned holding pin associated with one of said body members and normally extending for seating in a recess formed in the other of said body members, whereby said body members are normally keyed for pivoting as a cam follower unit but may be released for pivoting with respect to each other and thereby assume an inactive position upon application of force sufficient to dislodge said yieldingly positioned holding pin from said recess.

7. A fastener forming knife assembly comprising a stationary blade member and a matched movable blade member, said blade members being formed with aligned apertures defining a pivot axis for said movable blade member with respect to said stationary blade member, a pivot pin extending through said apertures, said pivot pin having a flange portion intermediate its length for abutting the exterior face of said stationary blade member and thereby fixing the extended position of said pin through said stationary blade member to said movable blade member, and said movable blade member being secured on said pivot pin in assembled relation with said stationary blade member, the portion of said pivot pin extending from said flange portion outwardly from the exterior face of said stationary blade member serving as a dowel member for locating said knife assembly upon mounting of said stationary blade member.

8. In a fastener forming and inserting machine adapted for forming fasteners from a continuous length of wire and having an operating head and associated means for cyclic actuation of fastener forming and fastener inserting operations, a fastener forming knife assembly comprising a stationary blade member adapted for mounting on said operating head, a matched movable blade member, said blade members being formed with apertures defining a pivot axis for said movable blade member with respect to said stationary blade member, a pivot pin extending through said apertures and adapted as a dowel means for locating said knife assembly on said operating head, said pivot pin having a flange portion intermediate its length for abutting the exterior face of said stationary blade member and thereby fixing the extended position of said pin through said stationary blade member to said movable blade member, and said movable blade member being secured on said pivot pin in assembled relation with said stationary blade member.

9. A fastener forming knife assembly comprising a stationary blade member and a matched movable blade member assembled with said stationary blade member for relative pivoting movement, said movable blade member being formed with a cylindrical projection concentric with its axis of pivoting movement, and said stationary blade member being formed with a complementary cylindrical recess, a passageway formed in said stationary blade member and opening into said cylindrical recess on an axis normal to the axis of said recess, and a second passageway in the cylindrical projection on said movable blade member positioned for alignment with the passageway in said stationary blade member, said second passageway having a flared opening at the surface of said cylindrical projection, whereby the trailing ends of fasteners formed by said knife assembly have a headed conformation.

10. In a fastener forming and inserting machine adapted for forming fasteners from a continuous length of wire and inserting said fasteners in material to be secured, a fastener forming knife assembly comprising a stationary blade member and a matched movable blade member assembled with said stationary blade member for relative pivoting movement between fastener forming and fastener inserting positions, said movable blade member being formed with a cylindrical projection concentric with its axis of pivoting movement, and said stationary blade member being formed with a complementary cyindrical recess, a passageway formed in said stationary blade member for receiving wire fed to said knife assembly for fastener forming operations, said passageway opening into said cylindrical recess on an axis normal to the axis of said recess, and a second passageway in the cylindrical projection on said movable blade member disposed for alignment in fastener forming position with the passageway in said stationary blade member, said second passageway having a flared opening at the surface of said cylindrical projection whereby the trailing end of fasteners formed by said knife assembly have a headed conformation.

11. A fastener forming knife assembly comprising a stationary blade member and a matched movable blade member, said blade members being formed with aligned apertures defining a pivot axis for said movable blade member with respect to said stationary blade member, a pivot pin extending through said apertures, said pivot pin having a flange portion intermediate its length for abutting the exterior face of said stationary blade member and thereby fixing the extending position of said pin through said stationary blade to said movable blade member, said movable blade member being secured on said pivot pin in assembled relation with said stationary blade member, said movable blade member being further formed with a cylindrical projection concentric with its pivot axis, and said stationary blade member having a complementary cylindrical recess, a passageway formed in said stationary blade member and opening into said cylindrical recess on an axis normal to the axis of said recess, and a second passageway in the cylindrical projection on said movable blade member positioned for alignment with the passageway in said stationary blade member, said second passageway having a flared opening at the surface of said cylindrical projection, whereby the trailing ends of fasteners formed by said knife assembly have a headed conformation.

JOHN G. WRIGHT.
JAMES M. CHAFIN.
EUGENE SUDAN.
CHARLES A. WATKINS.
JOHN H. HANSON.

REFERENCES CITED

The following references are of record in the file of this patent:

UNITED STATES PATENTS

| Number | Name | Date |
|---|---|---|
| 649,850 | Levalley | May 15, 1900 |
| 669,023 | Sasgrain | Feb. 26, 1901 |
| 812,452 | Richard | Feb. 13, 1906 |
| 905,600 | Sonneborn | Dec. 1, 1908 |
| 1,165,159 | Dunner | Dec. 21, 1915 |
| 1,388,846 | Brock | Aug. 30, 1921 |
| 1,497,676 | Fink | June 17, 1924 |
| 1,824,958 | Jones | Sept. 29, 1931 |
| 1,886,628 | Blair et al. | Nov. 8, 1932 |
| 1,896,661 | Breece | Feb. 7, 1933 |
| 2,049,240 | Ajouelo et al. | July 28, 1936 |
| 2,240,429 | Watkins et al. | Apr. 29, 1941 |
| 2,315,382 | Ajouelo et al. | Mar. 30, 1943 |